July 13, 1965 P. AMBILL 3,194,599
SELF-CLAMPING SUSPENSION
Filed July 22, 1963 2 Sheets-Sheet 1
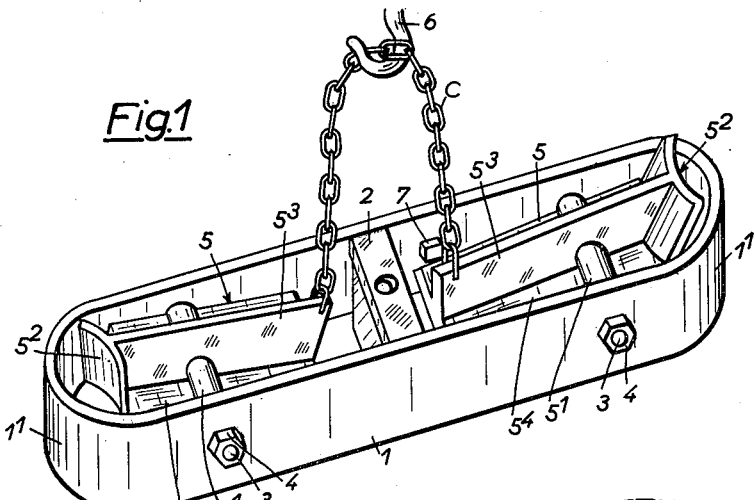
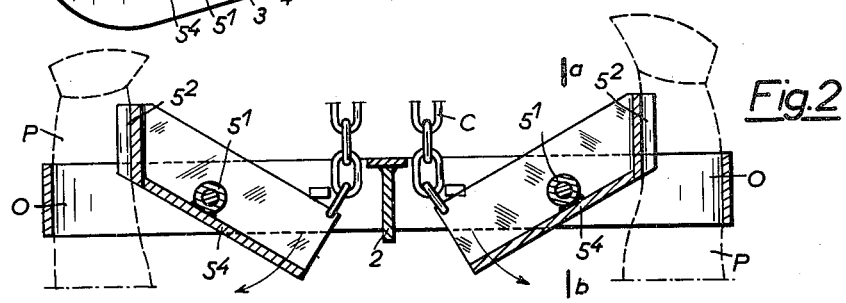
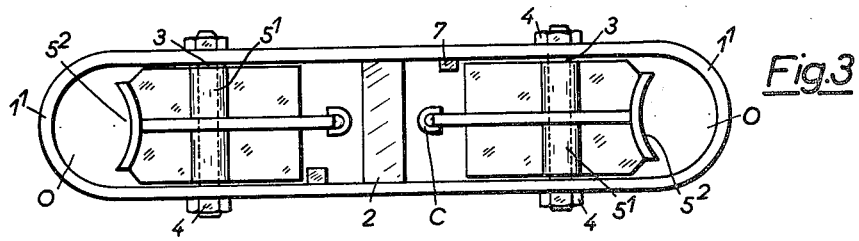
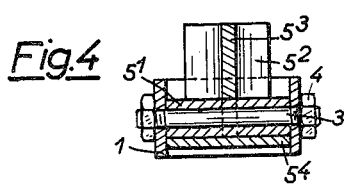
INVENTOR
Pierre AMBILL
BY J Delattre-Seguy
ATTORNEY

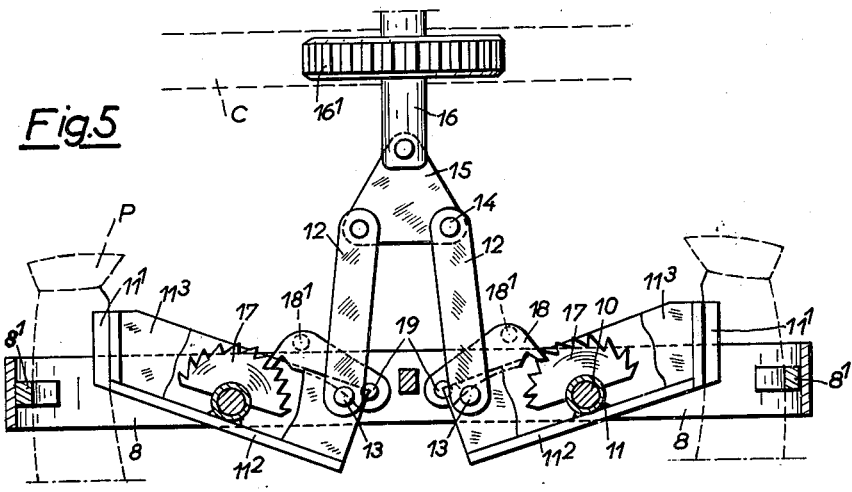
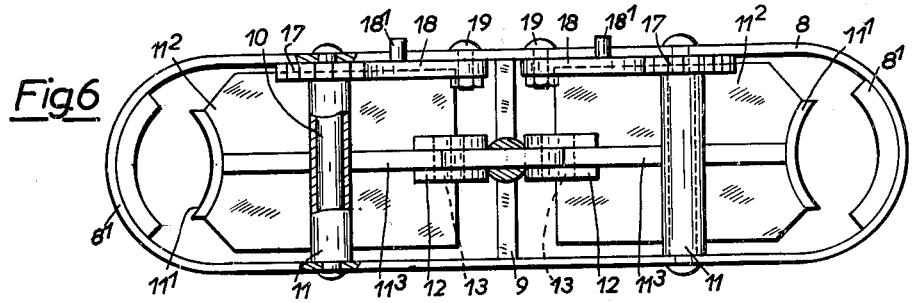
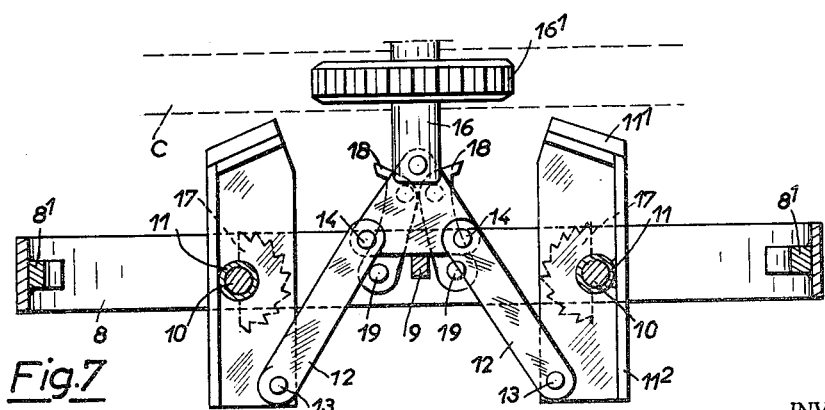

3,194,599
SELF-CLAMPING SUSPENSION
Pierre Ambill, 4 Cottage Montbreynaud, Saint-Etienne, Loire, France
Filed July 22, 1963, Ser. No. 296,662
Claims priority, application France, July 28, 1962, 8,502, Patent 1,331,011; June 10, 1963, 8,709
8 Claims. (Cl. 294—80)

It is well known that after cattle are killed in abattoirs they are suspended from hooks, or mobile carriages in the case of working with chains.

This method of suspension makes it possible to carry out the various operations of preparation, such as scalding, scraping, etc. and hitherto has used as suspension means chains which grip the animal's feet.

This suspension means has the disadvantage of injuring the feet whilst failing to guarantee sufficiently secure attachment. In fact the cattle often fall down, causing the stoppage of the working chain.

Therefore, it is in order to obviate these disadvantages that it has seemed necessary to provide the self-clamping suspension devices for cattle which are the subject of the present invention.

It should be understood that the term "cattle," whenever used in the specification, is intended to include all domestic quadrupeds raised for slaughter.

According to the present invention there is provided a self-clamping suspension device for cattle, including an oblong cage having a transverse strut, symmetrical pivot pins carried by said cage, self-clamping shoes pivotably mounted on said pins and the opposite end having at one end thereof a suspension chain, said profiled shoes forming bearing jaws in the form of sectors for acting on the animal's feet when an animal is suspended, the said feet being abutted at the opposite side by the interior of the rounded ends of the cage.

In order to give a clear picture of the invention without, however, limiting it, in the accompanying drawings:

FIGURE 1 is a perspective view of a self-clamping suspension device constructed according to the invention;

FIGURE 2 is a longitudinal sectional view on a small scale of the self-clamping suspension device when in use;

FIGURE 3 is an external plan view corresponding to FIGURE 2;

FIGURE 4 is a cross-sectional view taken along the axis $a$–$b$ in FIGURE 2;

FIGURE 5 is a view on a small scale and in longitudinal section of a self-locking suspension device constructed in a modified form, in the position of clamping the feet and locking the clamping shoes;

FIGURE 6 is a plan view partly in section, corresponding to FIGURE 5;

FIGURE 7 is a front view in longitudinal section corresponding to FIGURE 6, but in the position of disengaging and lifting the shoes.

This self-clamping suspension device for cattle is constructed essentially in accordance with the embodiment illustrated in FIGURES 1, 2, 3, 4 with a cage 1 of oblong form comprising rounded transverse sides $1^1$. This cage is formed in the example shown in the drawings by a flat iron member reinforced transversely at its central region by a T-shaped strut 2 which is fixed by welding or any other means.

Symmetrically with respect to the profiled strut 2, pivot pins 3 extend freely through the longitudinal sides of the cage 1 and are fixed by means of nuts 4 or any other means. These pivot pins 3 centre and allow the free rotation of each pivotable shoe 5 which is mounted within the cage 1.

Each shoe 5, the cross-section of which is inverted T-shaped, is constructed with a tubular hub $5^1$ for the engagement of the corresponding pivot pin 3. At its outer end, each shoe 5 forms a bearing jaw $5^2$ arranged obliquely and in the form of a sector facting towards the interior of the rounded transverse side $1^1$ of the cage 1.

A suspension chain C fixed by welding or any other means to the inner ends of the vertical webs $5^3$ of the shoes 5 permits the suspension of the assembly on a hook 6, a mobile carriage or the like.

It should be remarked that in the inoperative position the shoes 5 are abutted horizontally by means of studs 7 fixed to the inner faces of the cage 1 for co-operating with the horizontal base $5^4$ of the said shoes.

According to these features, when the apparatus is in use the shoes 5 are pivoted inversely to one another in the directions shown by the arrows in FIGURE 2 to form at each side an opening O comprised between the bearing jaws $5^2$ and the rounded sides $1^1$ of the cage 1. This opening O permits the free passage of the feet P of the cattle.

When an animal is suspended, the force exerted on the chain C causes the pivoting of the shoes 5 which, by their sloping jaws $5^2$, exert at each side a pressure against the feet P which are abutted at the opposite side by the rounded sides $1^1$.

Consequently, the cattle are held with a clamping force proportional to their own weight.

This suspension device is very efficient whilst at the same time having the advantage that it does not injure the flesh of the animals.

According to the embodiment illustrated in FIGURES 5, 6, 7, the self-clamping suspension device for cattle is constructed essentially with a cage 8 of oblong form having axially and internally along its rounded sides bearing sectors $8^1$ of flat or other configuration.

Transversely, the cage 8 is reinforced centrally by a strut 9 fixed by welding or any other means.

The pivot pins 10 connecting the longitudinal sides of the cage 8 are preferably fixed by welding and permit the centering and the free rotational movement of the sleeves 11 fast with the opposed shoes.

Each shoe forms a rounded bearing jaw $11^1$ arranged obliquely with respect to the base $11^2$, and a vertical and axial web $11^3$ which ensures rigidity during clamping.

The inner ends of the webs $11^3$ are coupled respectively to links 12 pivotably mounted on pins 13. At the other end, these links are pivotally mounted on pins 14 fast with an axial support 15 of triangular form held axially by the suspension pin 16.

The pin 16 fixed on the mobile carriage rolling on the conveyor track is rendered fast with the gearwheel $16^1$ which meshes with the rack C so as to bring about, in combination, the longitudinal advancing movement of the suspension device and its rotational movement. In view of these arrangements, it will be appreciated that, when the feet P of the animal are engaged, the vertical ascending force exerted on the shoes causes them to rock about the pivots 10 as illustrated in FIGURE 7, until the said feet pass through the openings between the jaws $11^1$ and the sectors $8^1$.

After this engagement, the dead weight of the suspension device causes the reverse pivoting movement of the shoes until the jaws $11^1$ come into contact against the feet P in such a manner as to provide a clamping force proportional to the weight of the animal.

It should be considered that according to this latter constructional form this clamping position of the shoes is locked by means of toothed sectors 17 fixed by welding or otherwise to the end of the sleeves 11. Each sector 17 by means of its appropriately orientated toothing permits the latching of the nose of a pawl 18 articulated on a pivot pin 19 fast with a longitudinal side of the cage 8.

According to this arrangement, it will be appreciated that when the shoes pivot in order to clamp the feet P, the pawls 18 co-operate freely with the sectors 17 to permit their rotation.

After clamping, the pawls 18 form stops thus preventing any pivoting of the shoes in the reverse direction.

It will be apparent that the shoes are restored to their opening position for disengaging the feet P after having rocked the pawls 18 as illustrated in FIGURE 7. For this purpose, it is proposed to equip the pawls with fingers $18^1$ in order to facilitate their manual disengagement.

This latter construction thus locks the shoes in the clamping position, preventing the disengagement of the uppermost foot of the animal when the said animal is situated in an inclined position necessitated by the preparation operations.

What is claimed is:

1. A self-clamping suspension device for cattle, including an oblong cage having a central transverse strut, longitudinal sides, and rounded ends, symmetrical pivot pins carried by said cage, self-clamping shoes pivotally mounted on said pins and having at one end thereof a suspension chain, the opposite end of said shoes forming bearing jaws in the form of sectors for acting on the animal's feet when an animal is suspended, the said feet being abutted at the opposite side by the interior of the rounded ends of the cage.

2. A self-clamping device as claimed in claim 1, wherein each shoe has a T-shaped cross-section and a tubular hub permitting a free journalling on the pivot pin connecting the longitudinal sides of the cage; at its end, each shoe forms a toothed bearing jaw.

3. A self-clamping device as claimed in claim 1, wherein the pivotable shoes, when in the inoperative position, are abutted by means of studs fixed on the inner faces of the cage to co-operate with a horizontal base on the said shoes.

4. A self-clamping suspension device for cattle as recited in claim 1 including toothed sectors fixed on the hubs of said shoes; and pawls mounted on said cage so as to lock said shoes when the feet of the animal in question are clamped; whereas, the disengagement of the pawls permits the restoring of the shoes for engaging the feet of the animal.

5. A self-clamping suspension device as claimed in claim 4, wherein suspension links pivotably connected on the one hand to the ends of the shoes opposite from those ends of said shoes which effect the clamping action and on the other hand to a triangular axial support whose apex is coupled to a rotary suspension pin.

6. A self-clamping suspension device as claimed in claim 4 and having within the rounded ends of the cage, flat sectors intended to serve as supports for the feet of the animal to bear against.

7. A self-clamping suspension device as claimed in claim 4 and having locking pawls arranged laterally within the cage and pivotably mounted on transverse pivots fast with the said cage.

8. A self-clamping suspension device as claimed in claim 4 and having fingers arranged on the pawls to permit, by pivoting movement, their manual disengagement from the teeth of the sectors.

References Cited by the Examiner

UNITED STATES PATENTS

| 448,413 | 3/91 | Curtis | 294—80 |
| 632,359 | 9/99 | Nilson | 294—80 |
| 1,044,060 | 11/12 | Lace | 294—80 |
| 1,655,301 | 1/28 | Williams | 294—79 |

SAMUEL F. COLEMAN, *Primary Examiner.*
ERNEST A. FALLER, *Examiner.*